(12) United States Patent
Hillier et al.

(10) Patent No.: US 11,129,210 B2
(45) Date of Patent: Sep. 21, 2021

(54) POWER OVER ETHERNET ADAPTER WITH COMMUNICATION DEVICE AND METHOD OF PROGRAMMING AND USING SAME

(71) Applicant: Mitel Networks Corporation, Ottawa (CA)

(72) Inventors: Peter Matthew Hillier, Ottawa (CA); Scott Richard Burton, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 1 day.

(21) Appl. No.: 16/404,099

(22) Filed: May 6, 2019

(65) Prior Publication Data

US 2019/0261434 A1    Aug. 22, 2019

Related U.S. Application Data

(62) Division of application No. 14/706,826, filed on May 7, 2015, now Pat. No. 10,334,635.

(51) Int. Cl.
| | |
|---|---|
| *H04W 76/10* | (2018.01) |
| *H04W 4/80* | (2018.01) |
| *H04L 12/10* | (2006.01) |
| *H04L 12/40* | (2006.01) |
| *H04W 12/06* | (2021.01) |

(52) U.S. Cl.
CPC ............ *H04W 76/10* (2018.02); *H04L 12/10* (2013.01); *H04L 12/40045* (2013.01); *H04W 4/80* (2018.02); *H04W 12/06* (2013.01)

(58) Field of Classification Search
CPC ....... H04W 76/10; H04W 4/80; H04W 12/06; H04L 12/10; H04L 12/40045
See application file for complete search history.

(56) References Cited

U.S. PATENT DOCUMENTS

| | | | |
|---|---|---|---|
| 8,013,466 B1 | 9/2011 | Thompson et al. | |
| 9,009,805 B1* | 4/2015 | Kirkby | H04N 21/2187 726/7 |
| 9,107,152 B1* | 8/2015 | Wurster | H04W 4/00 |
| 2005/0033997 A1 | 2/2005 | Boynton et al. | |
| 2010/0103943 A1 | 4/2010 | Walter | |
| 2013/0039362 A1 | 2/2013 | Emmanuel | |
| 2013/0261821 A1 | 10/2013 | Lu et al. | |
| 2014/0106677 A1 | 4/2014 | Altman | |
| 2014/0155031 A1 | 6/2014 | Lee et al. | |
| 2014/0215228 A1* | 7/2014 | Choon | G06F 1/266 713/300 |
| 2014/0370879 A1* | 12/2014 | Redding | H04M 3/42178 455/419 |
| 2015/0194906 A1 | 7/2015 | Yedinak et al. | |
| 2015/0222517 A1* | 8/2015 | McLaughlin | H04L 9/006 713/156 |
| 2016/0337945 A1* | 11/2016 | Watt | H04W 12/06 |

FOREIGN PATENT DOCUMENTS

EP        2577904 A1    4/2013

* cited by examiner

*Primary Examiner* — Alex Skripnikov
*Assistant Examiner* — Sharmin Chowdhury

(57) ABSTRACT

A wireless broadcasting device, systems including the device, and methods of programming and using the device are disclosed. The wireless broadcasting device is powered using power over Ethernet and can be used to provide proximity-based capabilities to devices that otherwise do not have such functions.

23 Claims, 5 Drawing Sheets

POWER OVER ETHERNET ADAPTER WITH COMMUNICATION DEVICE AND METHOD OF PROGRAMMING AND USING SAME

CROSS REFERENCED TO RELATED APPLICATIONS

This application is a division of, and claims priority to, U.S. patent application Ser. No. 14/706,826, filed May 7, 2015, and entitled "Power Over Ethernet Adapter with Communication Device and Method of Programming and Using Same," the contents of which is incorporated herein by reference.

FIELD OF THE DISCLOSURE

The present disclosure generally relates to electronic communication systems, devices, and methods. More particularly, the disclosure relates to communication devices that can be powered over the Ethernet, to systems including such devices, and to methods of using and programming the devices.

BACKGROUND OF THE DISCLOSURE

The proliferation of wireless devices has facilitated the growth of location-based services, such as location-based marketing, location-based social networking, location-based communication services, and the like. Many location-based services, such as marketing and communication services, use wireless transmitting devices, such as Bluetooth and/or Wi-Fi devices, to transmit location and/or proximity and other information to a user's mobile device. For example, location-based services can be used to broadcast marketing information to mobile devices within range of a broadcasting device—e.g., to broadcast specials or discounts to users' devices within a store. Similarly, location-based services can allow users to take advantage of communication system services when a user's mobile device is within broadcast range of a broadcasting device. For example, a user's status, such as "in the office" can be updated, or calls can be transferred between a user's mobile device and a user's desk phone when a user is within range of a broadcasting device. Likewise, calls can be transferred between a user's desk phone and a user's mobile device when a user is beyond a range of a broadcasting device.

Some broadcasting devices, such as Bluetooth Low Energy (BLE) (also known as Bluetooth Smart and Bluetooth 4.0), can operate in broadcast-only modes. In these cases, the broadcasting devices broadcast information that can be received and used by nearby mobile devices; such information can be static, or can be programmed—e.g., programmed over the air.

The broadcast-only role of the broadcasting devices generally does not require a host interface. Thus, when operating in broadcast-only mode, broadcast devices can be placed anywhere suitable power is available.

In some cases, it may be desirable to, for example, place the broadcasting devices on or near devices connected to the Ethernet. Unfortunately, many Ethernet-connected devices, such as phones or collaboration devices, draw power only over the Ethernet and are not configured to provide power to any additional devices. Thus, such devices generally cannot provide power to additional broadcasting devices. Accordingly, improved devices and systems for providing power to broadcasting devices are desired. In addition, methods of programming and using the devices and systems are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may be obtained by referring to the detailed description and claims when considered in connection with the drawing figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

Exemplary embodiments of the disclosure are described herein in terms of various functional components and various steps. It should be appreciated that such functional components may be realized by any number of hardware or structural components configured to perform the specified functions. For example, exemplary devices can employ various separate or integrated components comprised of various electrical devices, e.g., resistors, transistors, capacitors, diodes and the like, whose values may be suitably configured for various intended purposes. Further, it should be noted that while various components may be suitably coupled or connected to other components within exemplary circuits, such connections and couplings can be realized by direct connection between components, or by connection through other components and devices located therebetween.

Various exemplary embodiments of the disclosure provide a wireless broadcasting device. Exemplary wireless broadcasting devices draw power using power over Ethernet technology, wherein electrical power in addition to data is transmitted over an Ethernet cable. As set forth in more detail below, some broadcasting devices described herein can connect to powerable devices, such that the broadcasting devices and/or the powerable devices can be paired to a mobile device using wireless communication technology.

Exemplary wireless broadcasting devices described herein can be used for a variety of applications to provide over the top proximity-driven applications to power over Ethernet devices that are otherwise not capable of performing proximity-based functions. By way of examples, the wireless broadcasting device can be used to allow manipulations of a powerable device, such as a desktop phone or collaboration device, using a mobile device paired to the wireless broadcasting device.

Figure 1:
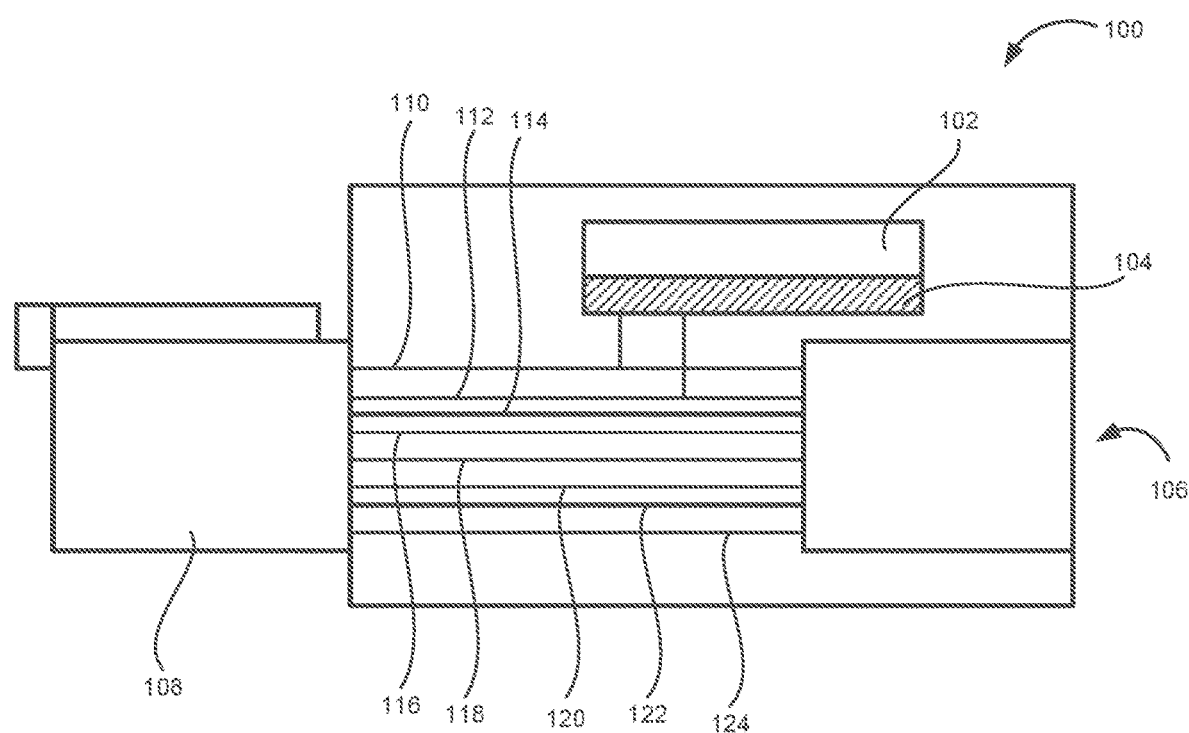
FIG. 1 illustrates a device in accordance with exemplary embodiments of the disclosure.

FIG. 1 illustrates an exemplary wireless broadcasting device 100. Wireless broadcasting device 100 includes a wireless transmitter 102, a circuit 104, and a plurality of conductors 110-124. Wireless broadcasting device 100 can also include a socket 106 and a plug 108.

In practice, wireless broadcasting device 100 can be connected to a powerable device, such as a phone, collaboration device, or the like, using plug 108, and be connected to a power sourcing equipment using, for example, an Ethernet connector coupled to socket 106. As explained in more detail below, power for wireless transmitter 102 can be obtained from the power sourcing equipment, without the need for any additional power and without interfering with verification or classification between the power sourcing equipment and the powerable device, or interfering with data transmission between an Ethernet cable and the powerable device. Further, wireless broadcasting device 100 can be configured to use less than about 100 mW of power. This power consumption is less than 3% of the 3.84 W lowest Power over Ethernet Class 1 powerable device limit, so power consumption of wireless broadcasting device 100 can be considered to be within a noise level of power supplied to a powerable device.

Attempting to use power over Ethernet to power wireless broadcasting device 100 or wireless broadcasting transmitter 102 by directly tapping into power over Ethernet feeds would interfere with the powerable device being able to negotiate (i.e., verify and/or classify a powerable device) its power over Ethernet requirements and this would break the end-to-end power over Ethernet model. As set forth in more detail below, circuit 104 has been designed to allow a powerable device and power sourcing equipment to negotiate power requirements, and allow wireless broadcasting transmitter 102 to draw power once the power over Ethernet negotiation between the power sourcing equipment and the powerable device has been completed.

Wireless transmitter 102 can include any device or circuit that can operate in a broadcast mode. By way of examples, wireless transmitter includes a Bluetooth transmitter, such as a Bluetooth Low Energy transmitter, and/or a Wi-Fi transmitter.

Conductors 110-124 can include any suitable conductors. For example, conductors 110-124 can include conductors typically found in Ethernet couplers, such as copper wires.

With typical Ethernet operation, power sourcing equipment verifies the presence of (and optionally classifies) a powerable device, and only then supplies power to the powerable device. This is done to ensure that a suitable powerable device is coupled to the power sourcing equipment prior to the power sourcing equipment supplying full voltage, so as to not damage any device that may not be suited to receive such voltage from the power sourcing equipment.

In accordance with various embodiments of the disclosure, circuit 104 is configured to allow power negotiation between power sourcing equipment and the powerable device, so that the power sourcing equipment verifies and optionally classifies a powerable device connected to wireless broadcasting device 100. After the power verification and optional classification between the power sourcing equipment and the powerable device are complete, circuit 104 is configured to provide suitable power to wireless transmitter 102. In other words, typical power verification and optional classification (e.g., as provided in IEEE 802.3 Standard) between the power sourcing equipment and the powerable device can proceed without interference from circuit 104 and/or device 102. Circuit 104 and wireless transmitter 102 can be standalone devices, part of a module, or form part of an integrated circuit.

Figure 2:
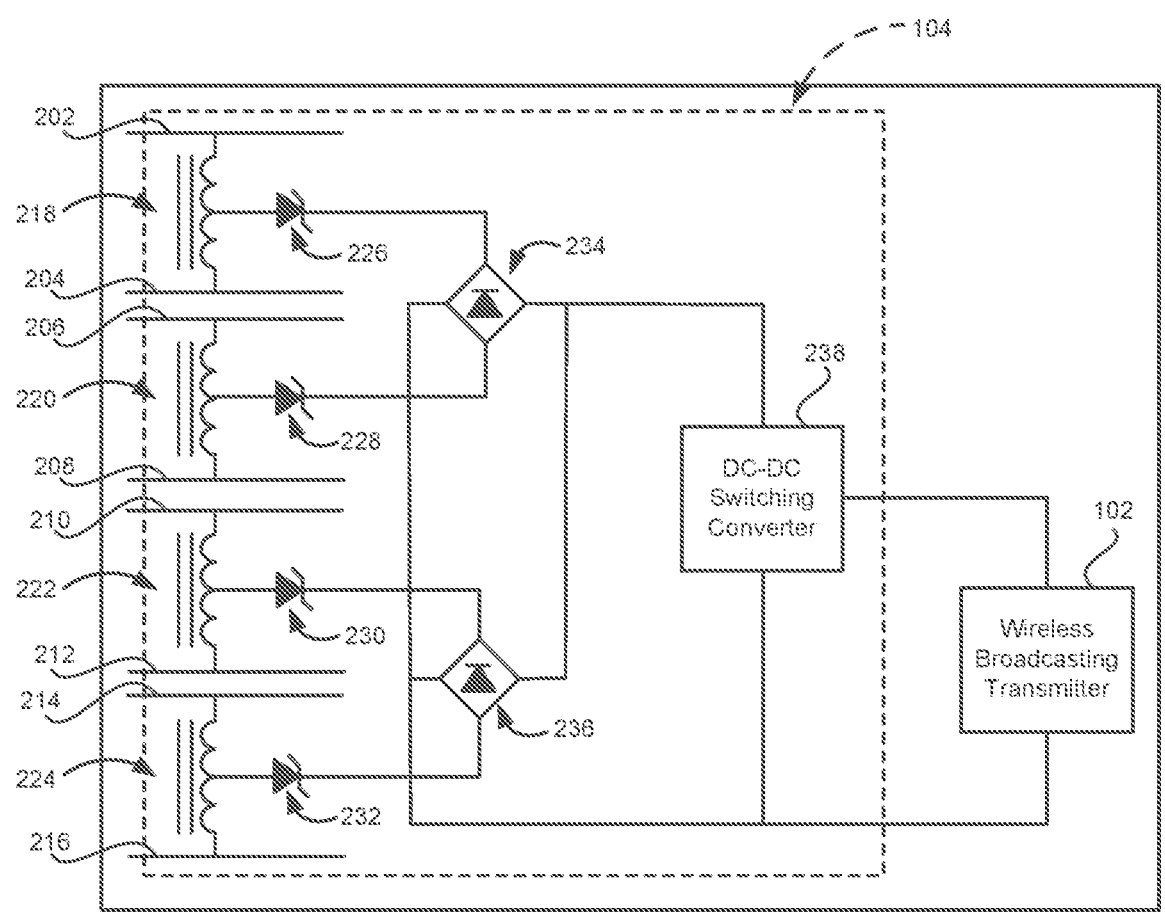
FIG. 2 illustrates a circuit in accordance with exemplary embodiments of the disclosure.

FIG. 2 schematically illustrates exemplary circuit 104. Circuit 104 is configured to allow a power source equipment to verify a presence of a powerable device and optionally classify the powerable device, and after the presence (and optional classification) of the powerable device is verified, circuit 104 is configured to supply power supplied from an Ethernet cable to wireless broadcasting device 102. In other words, circuit 104 is configured to provide power to wireless transmitter 102 from the power source equipment only if and when the power source equipment applies full operating voltage to a powerable device. Exemplary circuit 104 thus relies on a connection between a power source equipment and a powerable device to operate as described herein.

In the illustrated example, circuit 104 includes conductors 202-216, inductor components (e.g., magnetic core inductors) 218-224, diodes 226-232, diode bridges 234, 236, and a DC switching converter 238.

Conductors 202-216 are conductors suitable to pass power from the power source equipment to the powerable device. Conductors 202-216 can include, for example, copper conductor wires.

Inductor components 218-224 can include any suitable device that can transfer energy through magnetic induction as described herein (e.g., extracts a DC voltage), such as the illustrated magnetic core inductors or any Ethernet transformer. The inductance of the transformer winding acts as high impedance to a signal frequency, but near zero impedance to the power. Although illustrated as magnetic core inductors, inductor components 218-224 can additionally or alternatively include auto transformers, or transformers; other transformer windings are not required for this application. Further, although illustrated with four inductor components 218-224, other circuits within the scope of this disclosure can include, for example, two inductor components (over two conductor pairs) and related reduction in other circuit elements. The illustrated example works with Gigabit and other protocols and/or when the protocol is unknown.

As noted above, circuit 104 is designed to not interfere with the verification and/or classification process between the power source equipment and the powerable device. Accordingly, Zener diodes 226-232 have a Zener voltage greater than the verification/detection voltage (e.g., about 10 V maximum) and/or the classification voltage (e.g., about 20.5 V maximum). In the illustrated example, the diodes have a voltage of 27 VDC, below which they act as a high impedance device.

A power sourcing equipment voltage polarity is not guaranteed by the IEEE standard, so inductor components 218, 220, zener diodes 226, 228 and diode bridge rectifier 234 allow wireless broadcasting device 100 to function with either polarity between conductor pairs 202/204 and 206/208. Inductor components 222, 224, zener diodes 230, 232, and diode bridge rectifier 236 can be duplicated for the other two conductor pairs 210/212 and 214/216, permitting the wireless broadcasting device to operate from either pair set.

Diode bridge 234 or 236 output voltage supplies DC-DC switching converter 238 that can efficiently convert a wide-ranging input voltage to the low-voltage regulated power rail to transmitter 102 (e.g., at about 3.3 VDC in the illustrated example). Using a switching converter, rather than a linear regulator, allows wireless broadcasting device to operate using less power. However, other converters can be used in place of DC-DC switching converter 238 and be within the scope of this disclosure.

During operation of circuit 104, power source equipment (also referred to herein as power sourcing equipment) supplies power over conductors 202/204/206/208 or conductors 210/212/214/216. The power source equipment applies its source voltage between the center-taps of its 202/204 and 206/208 (or 210/212 and 214/216 as applicable) inductor. This voltage then appears on the center-taps of associated inductors in a powerable device. IEEE specifications require that the powerable device be capable of receiving power over either the 202/204 and 206/208 pairs or the 210/212 and 214/216 conductor pairs.

During the verification process, a powerable device identifies itself by presenting a designated resistance (e.g., 25 kohm DC resistance) to the power source equipment. The power source equipment detects this resistance by applying a voltage of up to 10V between two active conductor pairs and measuring the resultant current. If and when the power source equipment detects this current within the expected range, the power source equipment will then increase its output voltage to the operating level of 44-57VDC. Between successful detection and the application of full operating voltage, the power source equipment may optionally classify the powerable device. The voltage used during the classification is, according to the IEEE standard, between 15.5 and 20.5 VDC.

Figure 3:
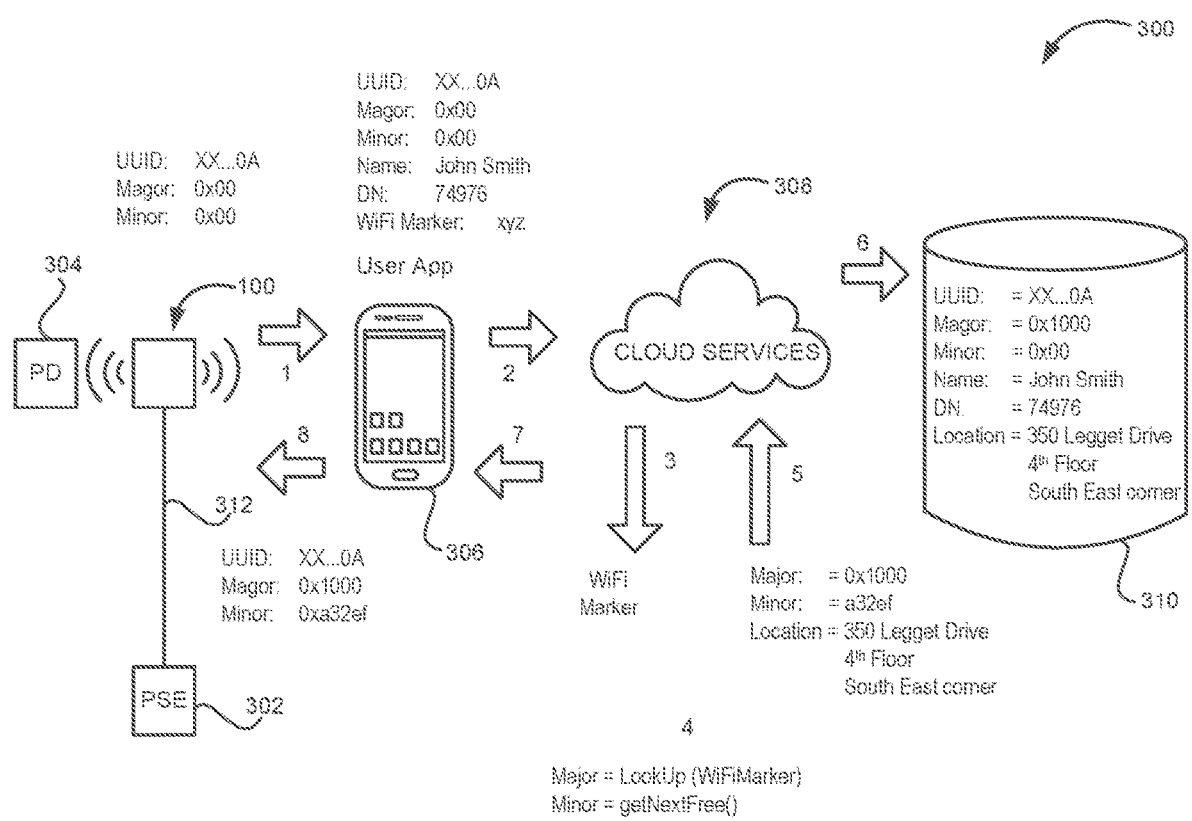
FIG. 3 illustrates a system in accordance with exemplary embodiments of the disclosure.

Turning now to FIG. 3, a system 300, suitable for binding a mobile device to a wireless broadcasting device or other device, is illustrated. System 300 includes a power sourcing equipment 302, wireless broadcasting device 100, a powerable device 304, a mobile device 306, a cloud service 308, and a database 310.

Power sourcing equipment 302 can include any suitable system that can provide power over an Ethernet cable. Exemplary sources can be IEEE 802.3 compliant. Power sourcing equipment 302 can be coupled to wireless broadcasting device 100 using an Ethernet cable 312.

Powerable device 304 can be any device that receives power from power sourcing equipment 302. Exemplary powerable devices include wireless access points, phones, video equipment, collaboration devices, and the like.

Mobile device 306 can include any suitable device with wireless communication features. For example, mobile devices can include a wearable device, a tablet computer, a smart phone, a personal (e.g., laptop) computer, a streaming device, such as a game console or other media streaming device, such as Roku, Amazon Fire TV, or the like, or any other mobile device that includes wireless communication capabilities.

In accordance with some exemplary aspects of various embodiments of the disclosure, mobile device 306 includes communication components (e.g., a short-range transmitter/receiver, such as a Bluetooth—e.g., Bluetooth Low Energy components) for short-range wireless transmission of information between device 306 and wireless broadcasting device 100. Mobile device 306 can also include an application, described in more detail below. The mobile device application(s) referred to herein can be standalone applications or form part of a native dialing or collaboration application and/or an operating system on device 306.

Cloud services 308 can include one or more servers or computers configured to perform instructions as set forth herein. Cloud services 308 can form part of a network, such as a local area network (LAN), a wide area network, a personal area network, a campus area network, a metropolitan area network, a global area network, a local exchange network, a public switched telephone network (PSTN), a cellular network, the like, and any combinations thereof. Cloud services 308 can include or be coupled to a PBX server using an Ethernet connection, other wired connections, or wireless interfaces. Cloud services 308 may be coupled to other networks and/or to other devices typically coupled to networks.

Database 310 can include any suitable database. Although illustrated separately, database 310 can form part of cloud services 308 and/or a server connected thereto.

Figure 5:
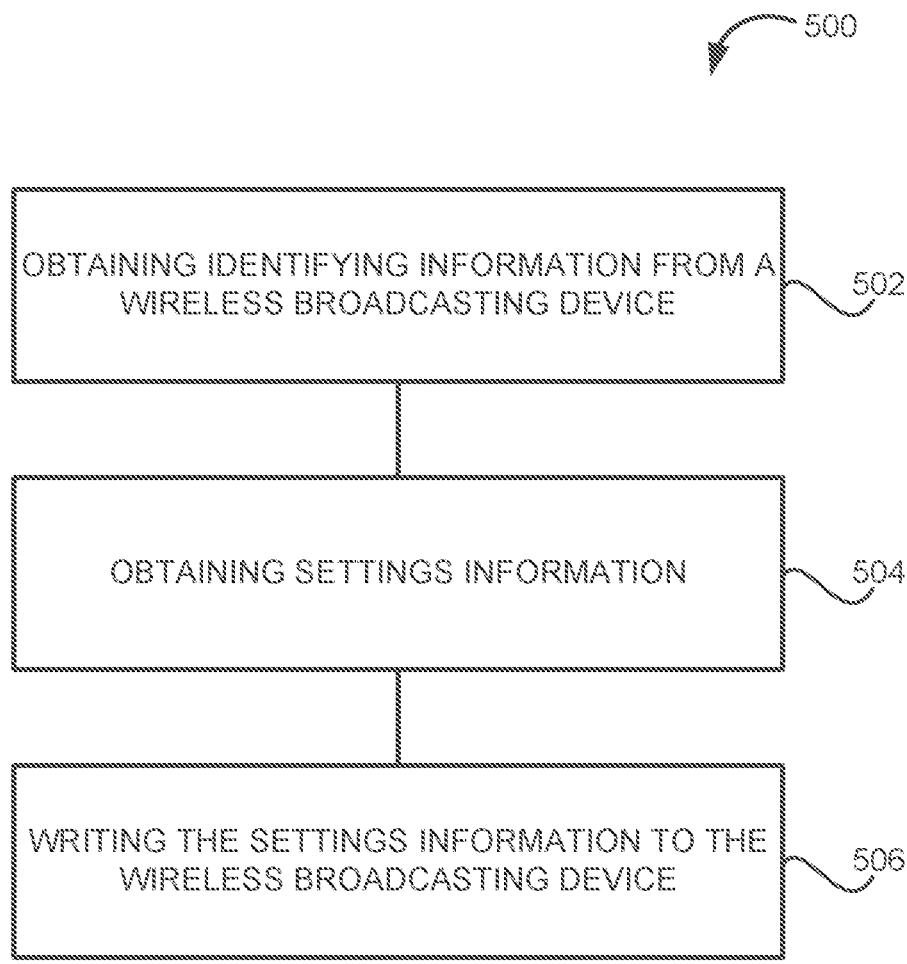
FIG. 5 illustrates a method of pairing a mobile device to a wireless broadcasting device in accordance with further exemplary embodiments of the disclosure.

FIG. 5 illustrates a method 500 of binding a user to a wireless broadcasting device, such as device 100, using, e.g., system 300. Method 500 includes the steps of obtaining identifying information from a wireless broadcasting device (step 502), obtaining settings information (step 504), and writing the settings information to the wireless broadcasting device (506). Method 500 is conveniently described herein in connection with system 300, and in connection with Bluetooth Low Energy (e.g., using iBeacon advertising). However, the description is not necessarily limited to this example, unless otherwise noted.

In the case of iBeacon advertising, a universally unique identifier (UUID) is used to identify the application, a major version number can be used to indicate location or venue and a minor version number can be used to represent a particular iBeacon or a sublocation. In addition, an RSSI (received signal strength indication) can be used to denote proximity to the beacon (from a few inches to 30 meters, for example).

The iBeacon devices can be programmed over the air, but this can be time consuming and subject to error. Specifically, each iBeacon device needs to be identified and then programmed. Typical techniques to program the devices over the air require an administrator to be in very close proximity, which can require significant administrator time. Further, the repetitive nature of entering programming information can be error prone. This would typically be resolved via some sort of host application; however, the proposed apparatus specifically prohibits this. Method 500 and system 300 address these problems.

During step 502, a mobile device, such as device 306, is used to obtain broadcast identifying information associated with wireless broadcasting device 100 (e.g., a wireless transmitter within wireless broadcasting device 100). A mobile application can be used to bind the user to wireless broadcasting device 100.

By way of example, step 504 can include the following. Wireless broadcasting device can transmit a universally unique identifier number (UUID). A user can then use the application to authenticate himself using, for example, a third-party service, such as Lightweight Directory Access Protocol (LDAP) to obtain, for example, a directory number, name, location, or the like of the user. Once the user is verified, the identifying information can be read by mobile device 306 and then be written to cloud service 308, as illustrated in FIG. 3. During this step, GPS and/or Wi-Fi can be used to determine location information.

As illustrated in FIG. 3, cloud service 308 can obtain major and minor version numbers based on the data provided (e.g., based on the Wi-Fi marker). The major number can be derived from, for example, the cell service of mobile device 306, GPS, a Wi-Fi network, a LDAP server, or other location related data. The minor number can be provided by, for example, a "next available index" routine and can be representative of the user. The UUID, major, and minor numbers can then be stored in database 310.

During step 506, mobile device 306 can use the application to over-the-air (OTA) program wireless broadcasting device 100.

Once wireless broadcasting device 100 has been programmed—e.g., using the method described above, one or more applications on mobile device 306 can be automatically launched when mobile device 306 is within broadcast range of wireless broadcasting device 100. Use of wireless broadcasting device 100 allows a powerable device without proximity abilities to become proximity enabled and thereby able to provide proximity-based (e.g., vertical) applications. The proximity-based solutions can be tailored based on the powerable device and/or a specific application.

Figure 4:
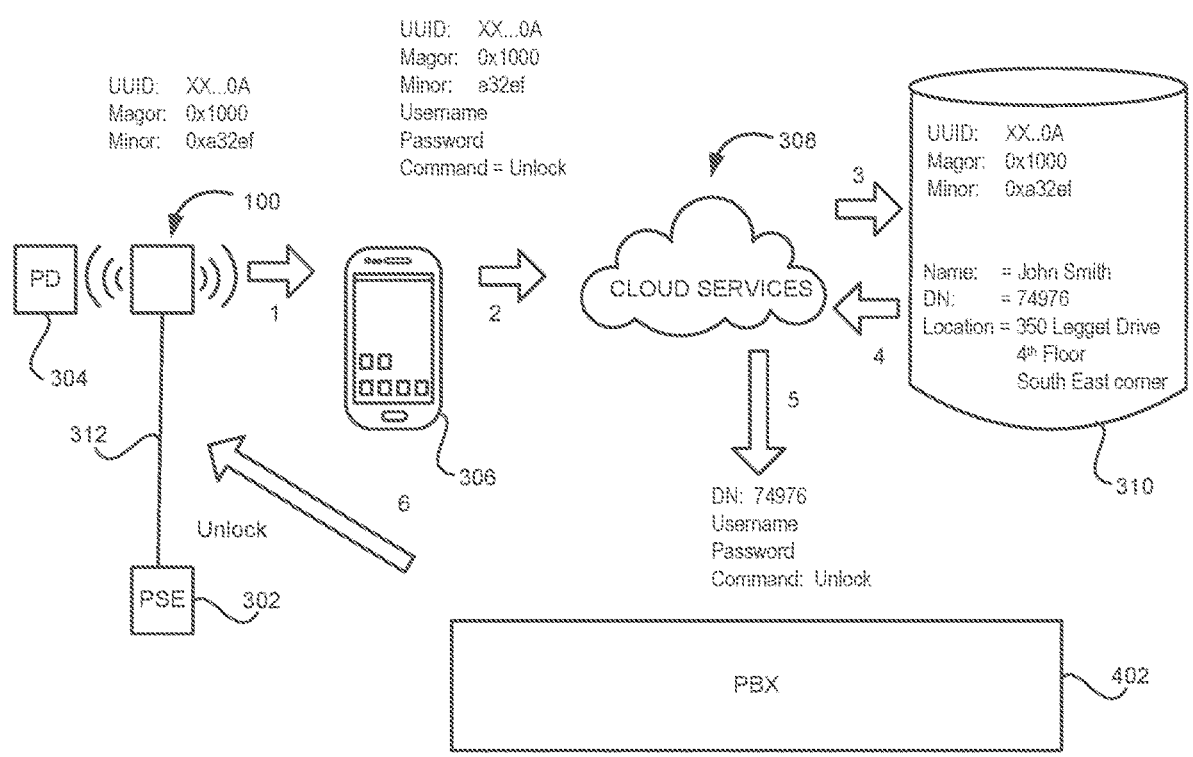
FIG. 4 illustrates another exemplary system in accordance with further embodiments of the disclosure.

By way of one example, a powerable device can include a desktop phone. In this case, with reference to FIG. 4, after mobile device 306 is paired with wireless broadcasting device 100, an application on mobile device 306 can use an application gateway (e.g., a Mitel Open Interface Gateway), to manipulate features of powerable device (e.g., phone) 304. The manipulations can include, for example, hot desk in, hot desk out, and screen lock, which can be based on a proximity of a user, namely, a proximity of mobile device 306 relative to wireless broadcasting device 100. More advanced features can be employed using systems and devices described herein. For example, advanced call-control features, such as call forward, follow me or call pickup (pick up a first user's call from another user's phone, based on a proximity of the first user to a wireless broadcasting device). Additionally or alternatively, comfort features, such as silencing a ringer on powerable device 304 when an associated user is not nearby, can be employed. In these cases, the features can be set via a PBX 402 interface in communication with mobile device 306.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

What is claimed is:

1. A method of pairing a mobile device to a wireless broadcasting device, the method comprising the steps of:
   using a mobile device, obtaining identifying information from the wireless broadcasting device;
   providing the identifying information to a server;
   obtaining settings information, the settings information including over-the-air (OTA) programming information;
   using the mobile device, writing the settings information to the wireless broadcasting device, the mobile device programming the wireless broadcast device using the OTA programming information in the settings information;
   pairing the mobile device to a powerable device, the powerable device coupled to the mobile device through the wireless broadcasting device; and
   powering the powerable device and the wireless broadcasting device using power source equipment coupled to the powerable device and the wireless broadcasting device using a data transmission cable, wherein, during the powering, the power source equipment only provides power to the wireless broadcasting device after applying full operating voltage to the powerable device.

2. The method of claim 1, wherein the method further comprises a step of writing user information to the wireless broadcasting device.

3. The method of claim 1, wherein obtaining settings information comprises:
   authenticating a user, and
   obtaining location information, the authenticating the user occurring prior to the step of obtaining location information.

4. The method of claim 1, further comprising a step of automatically launching an application on the mobile device after the writing the settings information and the pairing the mobile device to the powerable device steps and when the mobile device is within a broadcast range of the wireless broadcasting device, wherein the data transmission cable is an Ethernet cable.

5. The method of claim 1, wherein obtaining settings information further includes receiving a universally unique identifier number (UUID).

6. The method of claim 1, wherein obtaining settings information further includes obtaining location information using at least one of global positioning system (GPS) or WiFi.

7. The method of claim 1, wherein power consumption of the wireless broadcasting device during the powering is within a noise level of power supplied by the power source equipment to the powerable device.

8. The method of claim 4, wherein the application on the mobile device communicates with the wireless broadcasting device to manipulate a feature of the powerable device.

9. The method of claim 8, wherein the feature is one of hot desk in, hot desk out, screen lock, call forward, follow me call-control, call pickup, and silencing a ringer.

10. The method of claim 9, wherein the feature is selected based on at least one of the settings information and a proximity of the mobile device to the powerable device.

11. A mobile device, comprising:
    a processor; and
    a memory, coupled to the processor, the memory including instructions causing the processor to:
    obtain identifying information from a wireless broadcasting device;
    provide the identifying information to a server,
    obtain settings information, the settings information including over-the-air (OTA) programming information,
    write the settings information to the wireless broadcasting device, the mobile device programming the wireless broadcasting device using the OTA programming information in the settings information,
    pair the mobile device to a powerable device, the powerable device coupled to the mobile device through the wireless broadcasting device,
    wherein the powerable device and the wireless broadcasting device are powered using power source equipment coupled to the powerable device and the wireless broadcasting device using a data transmission cable, wherein, during the powering, the power source equipment only provides power to the wireless broadcasting device after applying full operating voltage to the powerable device, and launch an application on the mobile device when the mobile device is within a broadcast range of the wireless broadcasting device, wherein the application communicates with the wireless broadcasting device to manipulate a feature of the powerable device.

12. The mobile device of claim 11, the instructions further causing the processor to write user information to the wireless broadcasting device.

13. The mobile device of claim 11, wherein obtaining settings information includes:
authenticating a user, and
obtaining location information, the authenticating the user occurs prior to the step of obtaining location information.

14. The mobile device of claim 11, wherein obtaining settings information further includes receiving a universally unique identifier number (UUID).

15. The mobile device of claim 11, wherein obtaining settings information further includes obtaining location information using at least one of global positioning system (GPS) or WiFi, wherein the location information is used to determine a proximity between the mobile device and the powerable device, and wherein the proximity is used to select the feature of the powerable device to manipulate with the application on the mobile device.

16. The mobile device of claim 11, wherein the feature is one of hot desk in, hot desk out, screen lock, call forward, follow me call-control, call pickup, and silencing a ringer.

17. A non-transitory computer program product for pairing a mobile device to a wireless broadcasting device, comprising: a computer-readable medium, comprising: code for causing at least one processor to:
obtain identifying information from the wireless broadcasting device;
provide the identifying information to a server;
obtain settings information, the settings information including over-the-air (OTA) programming information;
write the settings information to the wireless broadcasting device, the mobile device programming the wireless broadcasting device using the OTA programming information in the settings information;
pair the mobile device to a powerable device, the powerable device being coupled to the mobile device through the wireless broadcasting device and the wireless broadcasting device programmed using the OTA programming information causing the powerable device to be proximity enabled to support proximity-based applications; and
power the powerable device and the wireless broadcasting device using power source equipment coupled to the powerable device and the wireless broadcasting device using a data transmission cable, wherein, during the powering, the power source equipment only provides power to the wireless broadcasting device after applying full operating voltage to the powerable device.

18. The computer program product of claim 17, wherein the code further causes the at least one processor to write user information to the wireless broadcasting device.

19. The computer program product of claim 17, wherein obtaining settings information includes:
authenticating a user, and
obtaining location information, the authenticating the user occurring prior to the step of obtaining location information.

20. The computer program product of claim 17, wherein the code further causes the at least one processor to automatically launch an application on the mobile device when the mobile device is within a broadcast range of the wireless broadcasting device, wherein the application is configured to manipulate a feature of the powerable device, and wherein the application configured as one of the proximity-based applications.

21. The computer program product of claim 17, wherein obtaining settings information further includes receiving a universally unique identifier number (UUID).

22. The computer program product of claim 20, wherein the feature is one of hot desk in, hot desk out, screen lock, call forward, follow me call-control, call pickup, and silencing a ringer.

23. The computer program product of claim 22, wherein the feature is selected based on at least one of the settings information and a proximity of the mobile device to the powerable device.

* * * * *